United States Patent
Stewart

(10) Patent No.: US 9,292,908 B2
(45) Date of Patent: Mar. 22, 2016

(54) SYSTEM, METHOD, AND COMPUTER PROGRAM PRODUCT FOR ENHANCING AN IMAGE UTILIZING A HYPER-CLARITY TRANSFORM

(71) Applicant: NVIDIA Corporation, Santa Clara, CA (US)

(72) Inventor: Michael Edwin Stewart, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 137 days.

(21) Appl. No.: 14/172,847

(22) Filed: Feb. 4, 2014

(65) Prior Publication Data
US 2015/0139543 A1     May 21, 2015

Related U.S. Application Data

(60) Provisional application No. 61/907,380, filed on Nov. 21, 2013, provisional application No. 61/911,453, filed on Dec. 3, 2013.

(51) Int. Cl.
*G06K 9/40* (2006.01)
*G06K 9/00* (2006.01)
*G06T 5/00* (2006.01)
*G06T 5/20* (2006.01)

(52) U.S. Cl.
CPC . *G06T 5/002* (2013.01); *G06T 5/20* (2013.01); *G06T 2207/10024* (2013.01); *G06T 2207/20016* (2013.01)

(58) Field of Classification Search
CPC . G06T 5/002; G06T 5/20; G06T 2207/20024; G06T 2207/20182; G06K 9/40; G06K 9/36; H04N 1/60
USPC .................................. 382/167, 254, 263, 274
See application file for complete search history.

(56) References Cited

U.S. PATENT DOCUMENTS

| 5,355,328 | A  | * | 10/1994 | Arbeiter et al. | 708/313 |
| 7,116,836 | B2 | * | 10/2006 | Rising, III | 382/254 |
| 7,492,962 | B2 | * | 2/2009  | Zhang et al. | 382/274 |
| 8,285,059 | B2 | * | 10/2012 | Marchesotti | 382/224 |
| 2010/0013988 | A1 | * | 1/2010 | Hulyalkar et al. | 348/441 |

OTHER PUBLICATIONS

Paris, S. et al., "Fast Bilateral Filter," last updated Mar. 2, 2007, pp. 1-4, retrieved from http://people.csail.mit.edu/sparis/bf/.
Hailan, G. et al., "A Modified Homomorphic Filter for Image Enhancement," The 2nd International Conference on Computer Application and System Modeling, 2012, pp. 0176-0180.
Gastal, E. S. L. et al., "Domain Transform for Edge-Aware Image and Video Processing," ACM Transactions on Graphics, vol. 30, No. 4, Article 69, Jul. 2011, pp. 69:1-69:11.
alex, "Dynamic range improvement for some Canon dSLRs by alternating ISO during sensor readout," Jul. 14, 2013, pp. 1-20.

(Continued)

*Primary Examiner* — Kanjibhai Patel
(74) *Attorney, Agent, or Firm* — Zilka-Kotab, PC

(57) ABSTRACT

A system, method, and computer program product are provided for enhancing an image utilizing a hyper-clarity transform. In use, an image is identified. Additionally, the identified image is enhanced, utilizing a hyper-clarity transform. Further, the enhanced image is returned.

19 Claims, 7 Drawing Sheets

(56) References Cited

OTHER PUBLICATIONS

Fattal, R., "Edge-Avoiding Wavelets and their Applications," ACM Trans. Graph., vol. 28, No. 3, 2009, pp. 1-10.
Kim, M. H. et al., "Edge-Aware Color Appearance," ACM Transactions on Graphics, vol. 30, No. 2, Article 13, Apr. 2011, pp. 1-9.
Oliva, A., "The Art of Hybrid Images: Two for the View of One," Art & Perception 1, 2013, pp. 65-74.
Paris, S. et al., "A Fast Approximation of the Bilateral Filter using a Signal Processing Approach," 2009, pp. 1-39.
Reinhard, E. et al., "Photographic Tone Reproduction for Digital Images," 2002, pp. 1-10.
Artusi, A. et al., "Selective Local Tone Mapping," Sep. 2013, pp. 1-5.
Akyuz, A. O. et al., "Style-based Tone Mapping for HDR Images," SIGGRAPH Asia 2013 Technical Briefs, Nov. 2013, pp. 1-4.
Wang, R., "Homomorphic Filtering Algorithm," Apr. 25, 2000, retrieved from http://fourier.eng.hmc.edu/e180/lectures/color2/node11.html.
Aubry, M. et al., "Fast and Robust Pyramid-based Image Processing," Technical Report, MIT-CSAIL-TR-2011-049, Nov. 15, 2011, pp. 1-11.

* cited by examiner

SYSTEM, METHOD, AND COMPUTER PROGRAM PRODUCT FOR ENHANCING AN IMAGE UTILIZING A HYPER-CLARITY TRANSFORM

CLAIM OF PRIORITY

This application claims the benefit of U.S. Provisional Application No. 61/907,380, filed Nov. 21, 2013, and U.S. Provisional Application No. 61/911,453, filed Dec. 3, 2013, the entire contents of which are incorporated herein by reference.

FIELD OF THE INVENTION

The present invention relates to digital imaging, and more particularly to digital image enhancement.

BACKGROUND

Digital images have a multitude of uses in all areas of society. For example, images may be digitally captured by users using a variety of devices. In another example, digital images may be displayed to users in both digital and print media. However, current techniques for enhancing digital images have been associated with various limitations.

For example, there is a high demand for improving the clarity and visual appeal of digital images. However, current solutions face problems including color balance involving the presence of mixed color illuminants, halos or ringing, and realistically remapping images. There is thus a need for addressing these and/or other issues associated with the prior art.

SUMMARY

A system, method, and computer program product are provided for enhancing an image utilizing a hyper-clarity transform. In use, an image is identified. Additionally, the identified image is enhanced, utilizing a hyper-clarity transform. Further, the enhanced image is returned.

DETAILED DESCRIPTION

Figure 1:
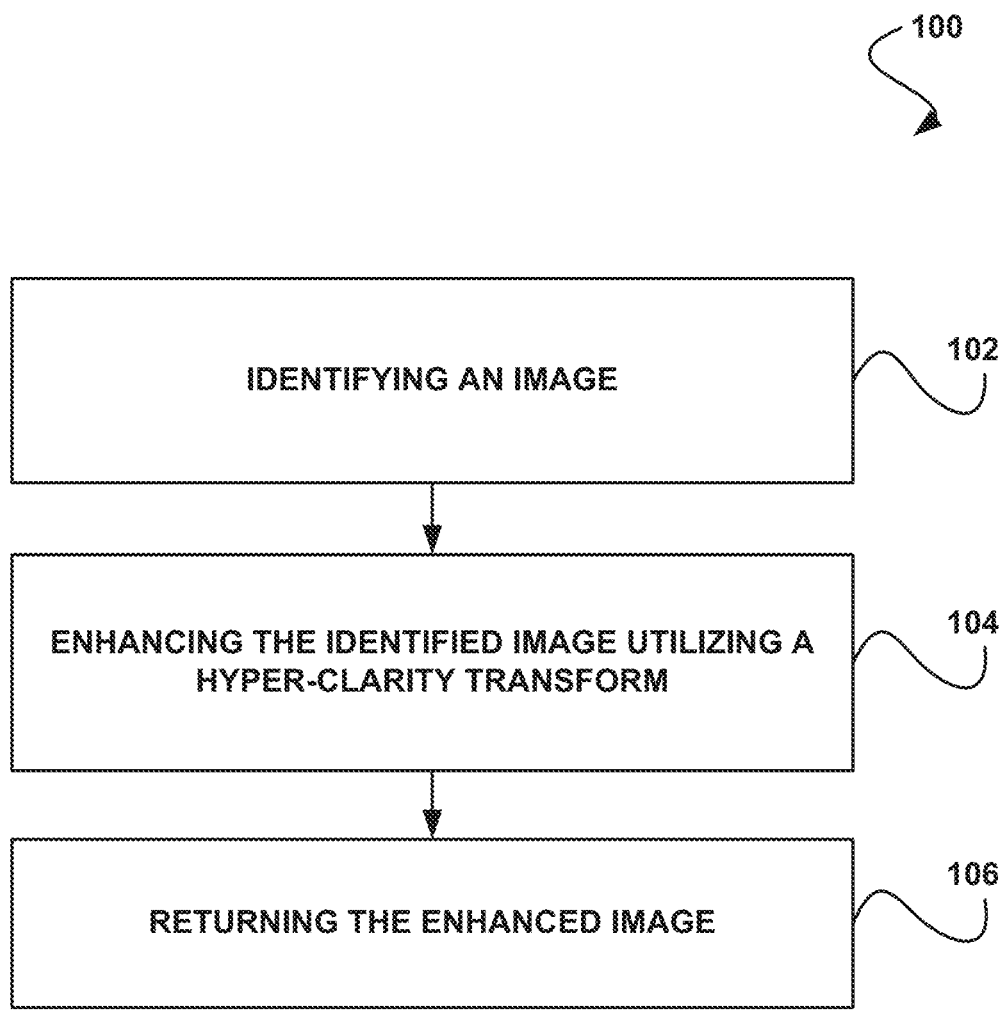
FIG. 1 shows a method for enhancing an image utilizing a hyper-clarity transform, in accordance with one embodiment.

FIG. 1 shows a method 100 for enhancing an image utilizing a hyper-clarity transform, in accordance with one embodiment. As shown in operation 102, an image is identified. In one embodiment, the image may be in a digital format. For example, the image may include a digital image. In another embodiment, the image may include a visual depiction of one or more objects within a scene. In yet another embodiment, the image may be identified in response to the input of the image by a user, application, etc. For example, a user or application may submit the image to be processed, enhanced, etc. In still another embodiment, the image may include an image from a still picture or an image taken from a video.

Additionally, as shown in operation 104, the identified image is enhanced utilizing a hyper-clarity transform. In one embodiment, enhancing the identified image may include performing spatially localized tonemapping on the image. In another embodiment, enhancing the identified image may include performing multi-resolution image sharpening on the image. In yet another embodiment, enhancing the identified image may include spatially correcting color saturation within the image. In still another embodiment, enhancing the identified image may include performing noise filtration on the image.

Further, in one embodiment, enhancing the identified image utilizing the hyper clarity transform may include enhancing the identified image utilizing a hyper-clarity transform (HCT) engine. For example, the HCT engine may include one or more components that may assist in performing the enhancing of the image. In one embodiment, the HCT engine may include a downsampler. For example, the downsampler may include a 3×3 symmetrical kernel convolution with one or more variable coefficients. In another example, each of the one or more variable coefficients may be assigned a predetermined value, may be adjusted according in proportion to a distance from another coefficient, etc.

Further still, in one embodiment, the HCT engine may include an upsampler. For example, the HCT engine may include a two-dimensional (2D) interpolating upsampler. In another example, the upsampler may produce an upsampled image, utilizing the identified image.

In another embodiment, the HCT engine may include a compositor. For example, the compositor may run at each level of a multi-level data structure. In another example, the compositor may receive an input image (e.g., the identified image, etc.), an upsampled image, and a resampled image. In yet another example, the compositor may produce an output image, utilizing the input. Also, in one embodiment, the HCT engine may include a chroma adjuster. For example, the chroma adjuster may run as a post processor. In another example, the chroma adjuster may be spatially variant.

In addition, in one embodiment, enhancing the identified image utilizing the hyper clarity transform may include enhancing the identified image utilizing one or more data structures. For example, the HCT transform may utilize an image pyramid data structure. In another example, the image pyramid data structure may include a plurality of levels (e.g., bands, etc.). In yet another example, each level within the image pyramid data structure may have a portion of the resolution of the previous level (e.g., half the resolution, etc.).

Furthermore, in one embodiment, a 3×3 bilateral may be used during the processing of each level of the image pyramid data structure. In another embodiment, a plurality of images may be maintained at each level of the image pyramid data structure. For example, each level of the image pyramid data structure may maintain an input/output image, an upsampled image (e.g., a low resolution image, etc.), a resampled output image from a lower resolution level of the image pyramid data structure, etc.

Further still, in one embodiment, each level of the image pyramid data structure may have its own set of controls. In another embodiment, a workbench of user controls may be used to manipulate level controls. In yet another embodiment, a control converter may be used to translate user controls into level controls.

Also, in one embodiment, enhancing the identified image utilizing the hyper clarity transform may include enhancing the identified image utilizing one or more algorithms (e.g., HCT algorithms, etc.). In another embodiment, one or more HCT algorithms may run in a recursive manner. For example, an HCT algorithm may run from a highest resolution level to a lowest resolution level and then from the lowest resolution level to the highest resolution level.

Additionally, in one embodiment, when running from a highest resolution level to a lowest resolution level, the HCT algorithm may downsample a current image to create an input image for the next lower resolution level. In another embodiment, the HCT algorithm may then upsample the image back to create an upsampled image (e.g., a low resolution image, etc.).

Further, in one embodiment, when running from a lowest resolution level to a highest resolution level, the HCT algorithm may upsample the lower resolution's output image to create a resampled image. In another embodiment, a compositor may then be run for that level.

Additionally, in one embodiment, enhancing the identified image utilizing the hyper-clarity transform may include radially varying a threshold adjustment for lens shading compensation. In another embodiment, enhancing the identified image utilizing the hyper-clarity transform may be included as a plug-in or part of a still picture editing program. In yet another embodiment, the image may be part of a video stream, such that video HCT and local tone mapping may be performed. In another embodiment, enhancing the identified image utilizing the hyper-clarity transform may be included as a plug-in or part of a video editing program.

In yet another embodiment, enhancing the identified image utilizing the hyper-clarity transform may be performed for video games as a post-rendering graphics processing unit (GPU) pass to apply HCT and local tone mapping to achieve increased apparent dynamic range and clarity. In still another embodiment, enhancing the identified image utilizing the hyper-clarity transform may be embedded in a system on a chip (SOC) (e.g., a Tegra SOC, etc.) for inclusion in one or more of a television and a monitor to apply to one or more of broadcast, playback, and video game inputs.

Further still, as shown in operation 106, the enhanced image is returned. In one embodiment, the enhanced image may be returned to a user or application that submitted the image for processing. In another embodiment, returning the enhanced image may include outputting the enhanced image to a display, sending the enhanced image to a database or other data storage device, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
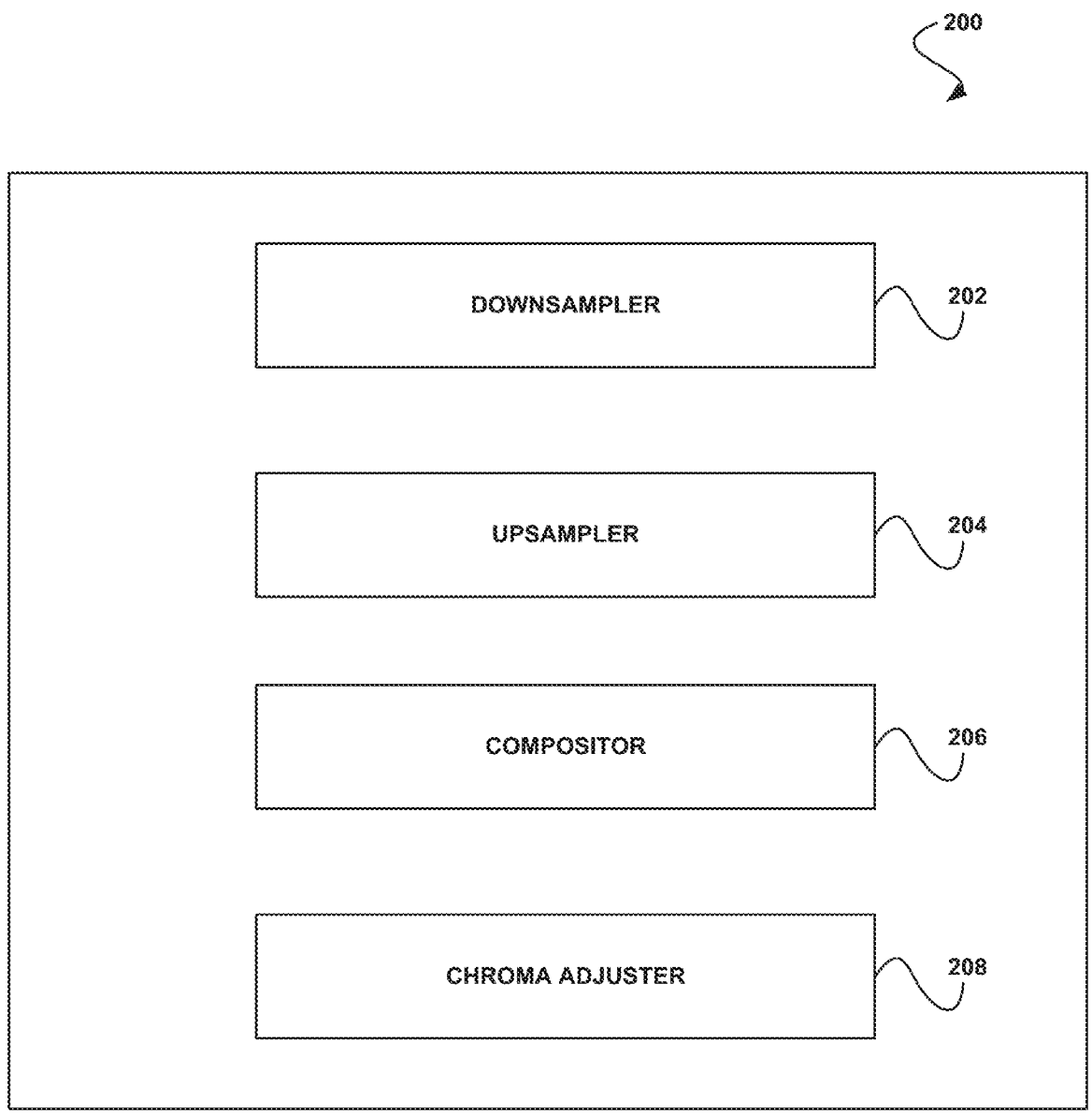
FIG. 2 shows an exemplary hyper-clarity transform (HCT) engine, in accordance with another embodiment.

FIG. 2 shows an exemplary hyper-clarity transform (HCT) engine 200, in accordance with another embodiment. As an option, the hyper-clarity transform (HCT) engine 200 may be carried out in the context of the functionality of FIG. 1. Of course, however, the hyper-clarity transform (HCT) engine 200 may be implemented in any desired environment. It should also be noted that the aforementioned definitions may apply during the present description.

As shown, the hyper-clarity transform (HCT) engine 200 includes a downsampler 202. In one embodiment, the downsampler 202 may include a conventional 3×3 symmetrical kernel convolution with variable coefficients. In another embodiment, the coefficients may be chosen with the center one being 0.25 and the others automatically adjusted in proportion to their distance from the center. In another embodiment, the coefficients may be chosen with the center one being 0.25, the edges being 0.125, and the corners being 0.0625.

Additionally, the hyper-clarity transform (HCT) engine 200 includes an upsampler 204. In one embodiment, the upsampler 204 may include a conventional 2D interpolating upsampler. Further, the hyper-clarity transform (HCT) engine 200 includes a compositor 206. In one embodiment, the compositor 206 may run at each level of a processing pyramid, receiving an input, upsampled, and resampled image, and producing an output image. In another embodiment, the compositor 206 may run at each level of a processing pyramid, receiving an input, upsampled, brightness, and resampled image, and producing an output image.

Further still, the hyper-clarity transform (HCT) engine 200 includes a chroma adjuster 208. In one embodiment, the chroma adjuster 208 may include a spatially variant chroma adjuster that runs as a postprocessor. In another embodiment, the chroma adjuster 208 may be an optional element of the HCT engine. In yet another embodiment, the HCT engine 200 may work on images in a YUV or other type of luma/chroma color space.

Figure 3:
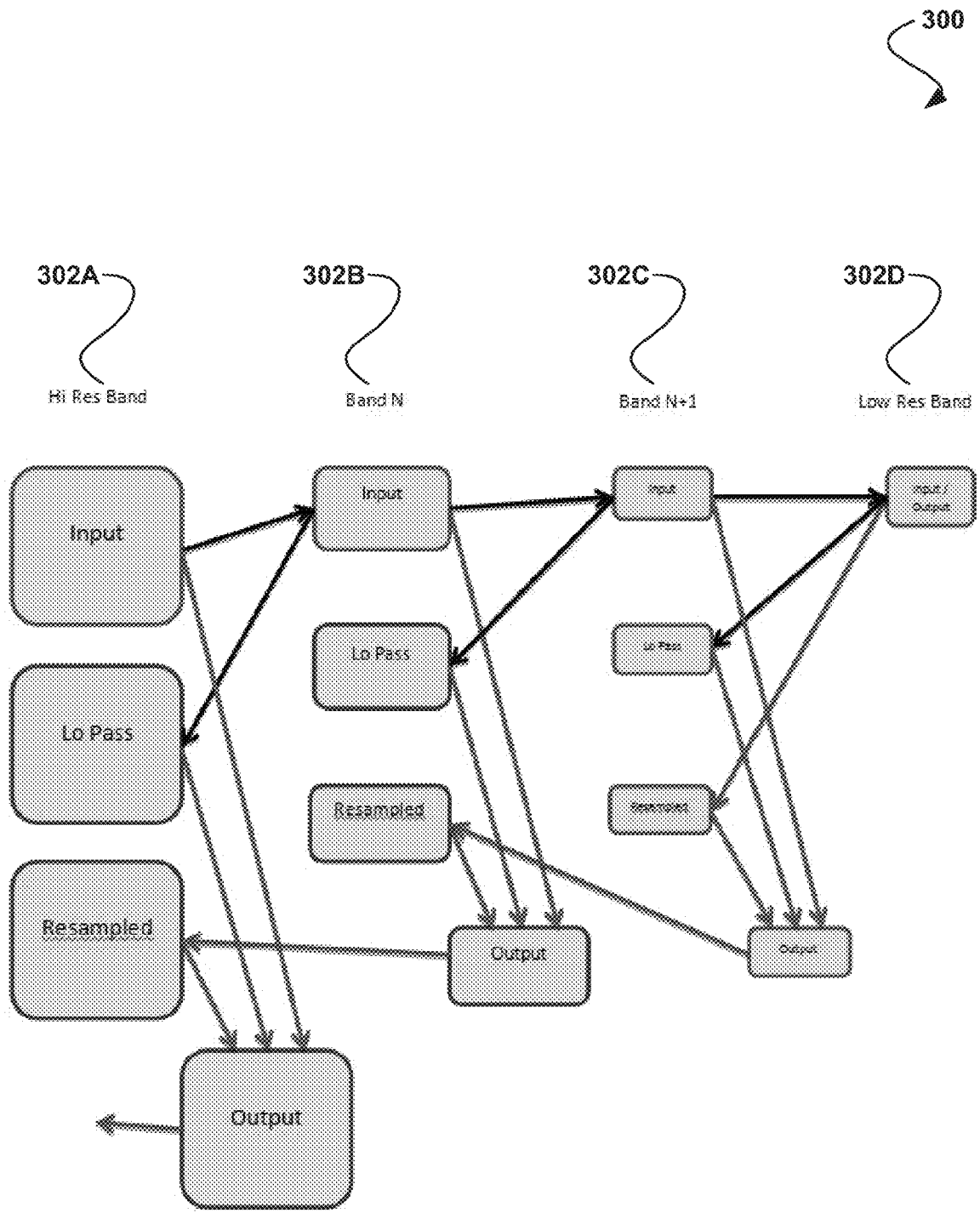
FIG. 3 shows an exemplary processing pyramid, in accordance with another embodiment.

FIG. 3 shows an exemplary processing pyramid 300, in accordance with another embodiment. As an option, the processing pyramid 300 may be carried out in the context of the functionality of FIGS. 1-2. Of course, however, the processing pyramid 300 may be implemented in any desired environment. It should also be noted that the aforementioned definitions may apply during the present description.

As shown, the processing pyramid 300 includes a plurality of bands 302A-D. Each band represents a level. In one embodiment, the processing pyramid 300 may access a data structure to perform HCT operations. For example, a main data structure may include an image pyramid where each level or band of the pyramid has half the resolution of the previous level. In another embodiment, three images may be maintained at each level: an input/output image, an upsampled (lo-res) image and a re-sampled output image from the lower resolution level. In yet another embodiment, each band of the pyramid may have its own set of controls. Additionally, a workbench of user controls may be employed to allow easier manipulation of the band controls; a control converter may perform this translation.

Additionally, in one embodiment, the processing pyramid 300 may include one or more algorithms. In another embodiment, the one or more algorithms may run in a recursive manner. For example, an algorithm of the processing pyramid 300 may run recursively from the highest resolution level to the lowest, and then the algorithm of the processing pyramid 300 may rewind back again. In the forward direction the algorithm may downsample the current input image to the next lower resolution level's input image, then upsample it back to create an upsampled (lo-res) image. In the backwards direction the algorithm may upsample the lower resolution level's output image to create the resampled image. The algorithm may then run the compositor for that level.

Further, in one embodiment, the compositor of the HCT engine may work pixel-by-pixel within the processing pyramid. For example, the difference between the input and upsampled pixel of the image may be determined by the compositor as the high-pass value. This may be thresholded by the compositor with a threshold value for the current level and the result may be multiplied by the contrast value for that level, with an option to adjust for the brightness or darkness of the pixel, which may result in the contrast amplification. The resampled value may be scaled by the compositor around the pivot point by the input scaling value, except that this scaling may first be throttled based the difference value (suppression). This result may be added to the contrast value and may become the compositor's output image for that level. In another embodiment, the threshold may be radially varied for lens shading compensation.

Further still, in one embodiment, the input and output buffers of the processing pyramid 300 may be the same. In another embodiment, luma operations may change the apparent saturation in a spatially variant manner. In yet another embodiment, the chroma adjuster may mitigate this change. For example, the chroma adjuster may go to a level that corresponds to the chroma resolution and may compare the upsampled (lo-res original) with the output and may adjust the chroma saturation based on this brightness difference. In still another example, normal tonemapping may be performed on the luma component.

The fact that an image can be broken down by its spatial frequencies, each an octave (or power of 2) apart, and then reconstructed from those components may be a basis for modern video compression.

Spatial Tonemapping

For an image of dimension N, breaking it down into a pyramid of log 2 N bands may convert its representation into the spatial frequency domain. Each band may control twice the frequency of the lower resolution band. Low frequency components may represent the illuminant portion of the image. Reducing the illuminant portion of the image may allow greater range for amplifying the higher frequency components which correspond to the reflectant portion of the image. This may be included as a basic function of spatial tonemapping. Images processed by just these means alone may be susceptible to halos and other artifacts.

Reducing Halos Using a Band-by-Band Operation of a Compositor

Earlier methods to attempt to reduce halos may be very computationally intensive and may lack a degree of spatial frequency control. The band-by-band operation of the compositor may use two techniques to surmount these problems in a manner that may be much more computationally efficient than earlier methods and with superior, more natural results.

First, at each level the compositor may recursively feed the lower resolution bands results into an input scaling (e.g., around a mid-range pivot point brightness) step to reduce the contrast of lower frequencies, and the compositor may add this into a high-pass amplifier (high-pass being the difference between the low pass and input images for this band). This may maintain a controlled contrast ratio between each frequency octave.

This may create an artifact in areas that lack higher frequency information. For example, broad areas of black or white may become gray. A second technique of the compositor may be aimed at removing or controlling this artifact. Where the unamplified high-pass component is less than a threshold the input scaling factor for the resampled image may be attenuated (cross-faded to one). This may be included within input scaling suppression.

For spatial tonemapping the input scaling may be emphasized in the lower frequency bands, to normalize the illuminant, and may be progressively neutralized to a very small amount in the higher frequency bands. Suppression may be only performed where input scaling is emphasized in the low frequency bands and not in the high frequency bands. Contrast may be amplified in all bands, and may gradually increase in the higher resolution bands.

Increased high-pass contrast in the highest pass band may act like conventional image sharpening, (e.g., convolutional filter or unsharp mask). However, since there is higher-to-lower contrast relationship between each band and its lower resolution neighbor, the result may include a multi-resolution sharpening. As a result, the image may appear sharpened regardless of resizing or the viewing distance. This is in contrast to conventional sharpening, which only operates at the highest spatial frequency, and may lose its effect when downsized or view from afar. This method is also less susceptible to halo artifacts or ringing.

Performing Noise Filtering Concurrently with Sharpening

In one embodiment, noise filtering may be done at the same time as sharpening. For example, the compositor may examine the unamplified high-pass value and may compare it with a noise threshold. When the unamplified high-pass value is less than the threshold, the compositor may cross-fade the amplified high-pass with zero before adding it to the resampled image. This may achieve a noise reduction that has a somewhat similar effect to that of a bilateral filter, but which may lower computational cost. Extending this operation to layers below the highest resolution layer may increase the area of support for the noise reduction filter. Since the downsampling may reduce the noise in each progressive layer, the threshold values may be reduced correspondingly as well. By controlling the depth of the number of bands that perform noise filtering a user may control the area of support of the filter.

Tonemapping

While tonemapping may be performed on the luma component, it may also be advantageous to perform the same type of operation on the chroma planes as well. First, applying the noise reduction filter directly may be effective in reducing chroma noise. Second, by providing some contrast increase in the top few layers, the boundaries of sharp chroma changes may become more perceivable by the eye, which may enhance the perception of edges, especially as the human eye is less adept at perceiving chroma differences spatially as it is luma. This may be additionally helpful in color space domains such as YUV420 where the spatial chroma resolution has been decreased.

Moreover, the tonemapping functionality, with its ability to separate the illuminant from the reflectant, may be used to achieve mixed-illuminant color correction by spatially biasing the illuminant to neutral gray. In color spaces such as YUV, where the neutral (gray) chroma values are at the numeric midpoint, (as with luma) the tone mapping function may be used as is for mixed-illuminant color correction. For identifying situations with broad color biases, such as colored walls, the input scaling suppression may be slaved to a more sophisticated color temperature identification function, such as identifying color light regimes by comparing sample points to known lists of outliers for all likely color temperatures.

Mimicking Human Perception

The above processes may have a physiological basis in mind and may mimic human perception in a natural way. Human perception of clarity may be determined at least in part by the perception of contrast. Natural impediments to clarity such as haze, scatter, veiling glare, all may add scattered light that effectively "fogs" the image, which may reduce the contrast visible to the eye. Images with very high resolution may not appear to be very clear if they lack contrast.

The use of high just frequency sharpening may not increase the overall perception of clarity because other spatial frequencies are left unchanged. Only a perception of sharpness may be generated. By employing multi-resolution sharpening the contrast may be increased in a way that mimics the effects of greater overall clarity, which may give the entire image a clearer presentation. In fact, the multi-resolution contrast enhancement may be increased past that of even of a perfectly clear scene itself (e.g., a condition of hyper-clarity, etc.). Yet because hyper-clarity mimics the way the brain's own perception works, the image may be perceived as genuinely real.

Figure 4:
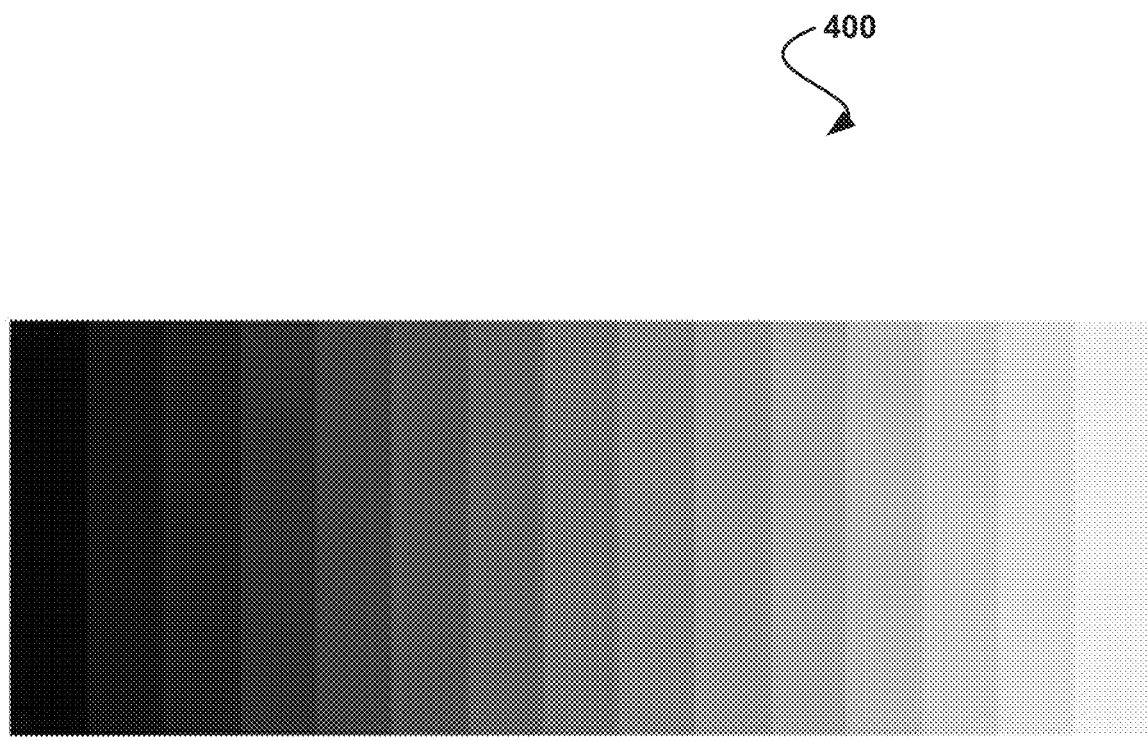
FIG. 4 shows an exemplary step wedge, in accordance with another embodiment.

Human physiology itself may perform a flavor of tonemapping. Consider the step wedge optical illusion. Halos may be one of the common artifacts for tonemapping. In looking at the edges between the different steps in a gray scale step wedge, the darker side may appear darker at the edge and the lighter side may appear lighter at the edge. This may include the kind of halo effect that one would expect of a tonemap. An evolutionary advantage may be gained by physiological tonemapping in that it may help facilitate pattern recognition across a wide spectrum of brightness. Since the halos are not in the image itself, then they must come from human perceptual physiology. An exemplary step wedge 400 is shown in FIG. 4.

Figure 5:
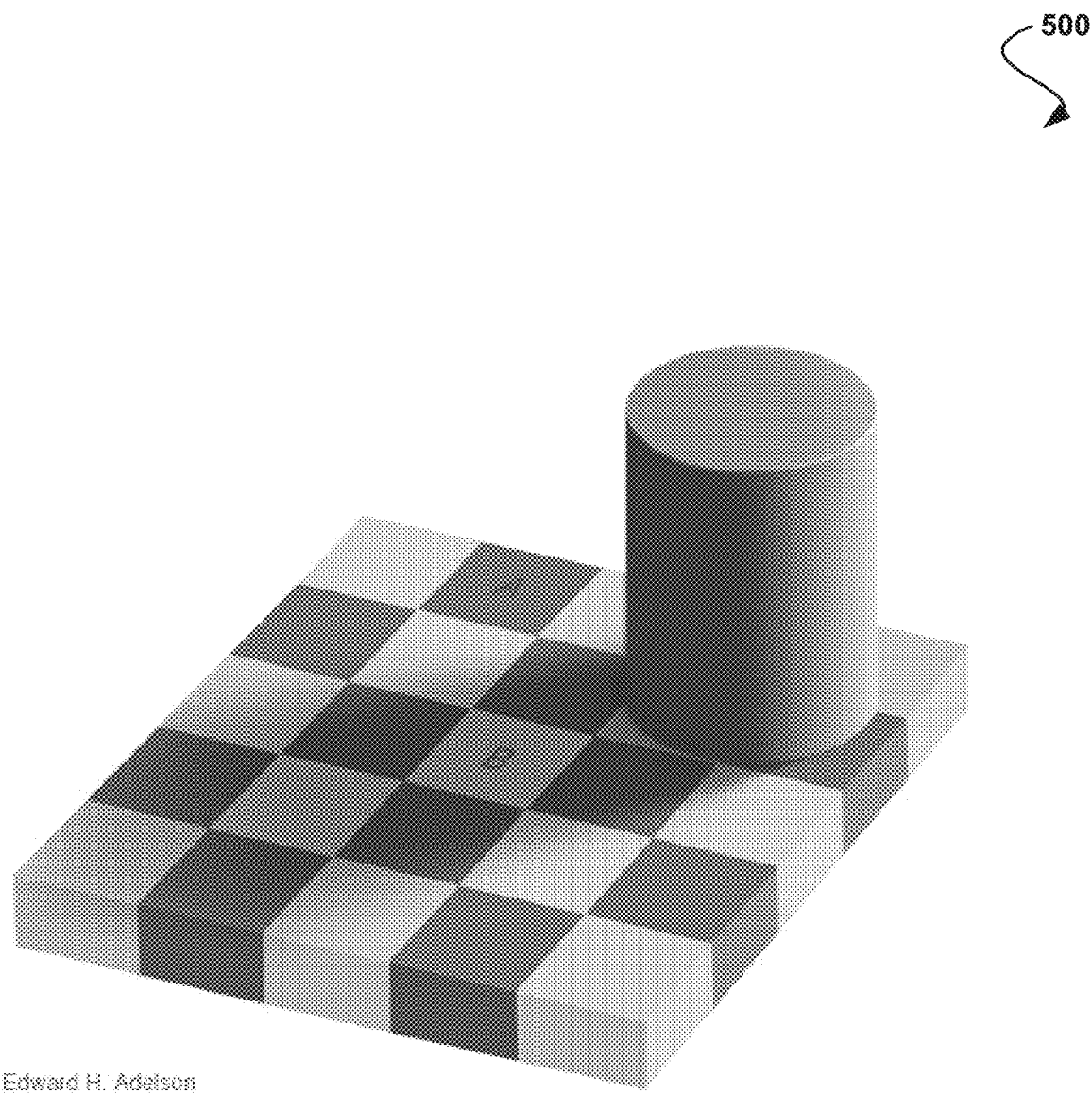
FIG. 5 shows the Edward H. Adelson checkerboard, in accordance with another embodiment (prior art).

Furthermore, there is evidence that human physiology may be capable of interpreting tone mapped imagery. Consider the Edward H Adelson checkerboard. Here squares that have identical gray values appear to have very different brightness because of their local intensity contexts. Again, this effect may come from perceptual physiology, and likely from a physiological structure that can perform, and interpret spatial tonemapping. See, for example, FIG. 5 (prior art), which illustrates the Edward H. Adelson checkerboard 500 in accordance with one embodiment.

Further still, there is evidence that human perception may be neurologically implemented as a pyramid of decreasing resolutions. Again, this may convey a significant evolutionary advantage in that pattern recognition may be performed faster at lower resolutions, without impairing the native resolution of the eye, and with considerably less neurological "hardware." Analogously, resolution reduction may be a tactic employed by computer facial and pattern recognition programs for efficiency.

For example, consider the "Einstein" optical illusion. This was formed by combining the high resolution frequencies of an image of Einstein with the low resolution frequencies of an image of Marilyn Monroe. At close range it looks like Einstein, but at a distance it changes to Marilyn Monroe. This may show that pattern recognition is performed in a range of spatial frequencies. It also may help uncover the depth of the human pyramid, at least as used for pattern recognition. At the distance where the image of Einstein starts to disappear into the image of Marilyn Monroe may be right about the spatial frequency of the bottom of the part of the human physiological pyramid that is used for pattern recognition. See, for example, "The Art of Hybrid Images: Two for the View of One," (Aude Oliva, Art & Perception, vol. 1, 2013), which is hereby incorporated by reference in its entirety.

There is evidence that the human pyramid may extend to even lower frequencies besides just the ability to tonemap, which may requires the low frequencies to suppress the illuminant. There is also the remarkable ability of the human eye to manage mixed illumination scenes to the envy of color film for a hundred years. If human perception was also tonemapping in some sort of a "chroma" domain then it would naturally tend to produce mixed illumination correction. This might explain why the eye can't perform the same correction when looking at a photograph. A photo typically subtends a much smaller angle of view than the entire visual field when viewed normally. Without the low frequency components that an entire visual field produces, the neural pathways can't produce the proper low frequency bands needed to neutralize the illuminant.

All tonemapping methods may produce halos of some kind. This may be a result of having to spatially adjust gray scale placement. The Hyper-Clarity Transform may create images with improved realism, compared to other methods because it may closely match actual human physiology, and therefore may convincingly fool the human mind into think that the portrayed scene is actually real.

Controls

In practice a user may encounter a wide variety of image sizes. Since HCT may require parameters to be set for each band, and the number of bands is dependent on the image size, a means for a user to manipulate image size independent controls may be implemented.

In one embodiment, four values may be used to control each variable for the bands. For example, there may be a higher resolution value, a lower resolution value, a ramp start value, and a ramp finish value. The ramp values may be normalized over the unit interval; for example, 0.0 may correspond to the highest resolution band of the pyramid, and 1.0 may correspond to the lowest resolution band of the pyramid. The bands in between may be divided over the unit interval.

For all bands less than the ramp start value the higher resolution value may be used, and for greater that the ramp finish value the lower resolution value may be used. Values may be interpolated for bands in between. This may provide a means independent of image size of specifying parameters that will produce similar looking results on a variety of image sizes.

The noise filter threshold may be controlled by a different, but simpler means because its effect may be determined by the number of bands of its depth, not of the size of the entire pyramid. Therefore, the noise filter threshold value may apply to the high resolution band, and each lower band may be multiplied by a decay factor corresponding to the reduction of noise at each lower band. Additionally, an absolute limit to the number of bands where noise thresholding is applied may be provided. For using HCT as a noise filter only, the total number of bands (depth) of the pyramid may be limited as well. Variations on these controls may include more ramp points and splining to smoother band transitions.

Overview

The Hyper-Clarity Transform (HCT) may include a single, unified computational process for image enhancement that addresses a multitude of photographic problems. HCT may perform spatially localized tonemapping in a manner that mimics and matches human perceptual physiology producing the least visible halos. Additionally, HCT may perform multi-resolution image sharpening that produces visual sharpened images across a wide range of subsequent image resizing.

Further, HCT may spatially correct color saturation based on brightness changes introduced by the tonemapping. Further still, HCT may perform noise filtration. In this way, HCT may generate a sense of greater visual clarity than even possible in an actual real scene. Also, tonemapping, sharpening, and filtering may all be done independently or in combination with one another within HCT.

Figure 6:
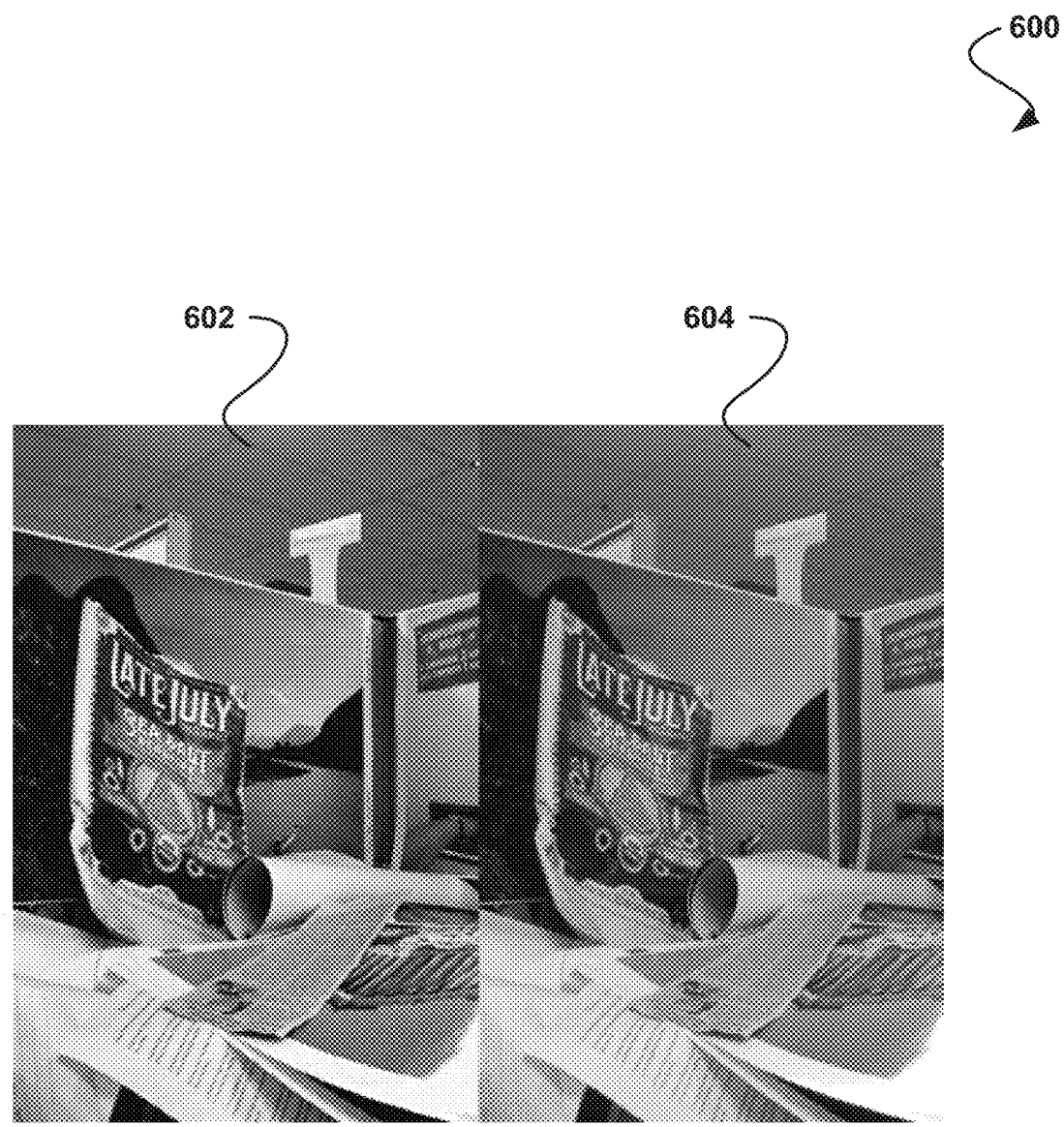
FIG. 6 illustrates a result of applying HCT to an unadjusted image, in accordance with another embodiment.

Further still, HCT may perform mixed illuminant color correction. Also, HCT may be computationally efficient compared to other methods. HCT may be readily implemented in contemporary SIMD CPU engines such as SSE (Intel) or Neon (Arm). HCT may be readily implemented in OpenGL ES2 shaders and that can be run in a wide variety of contemporary Graphics Processing Units (GPUs) for greater performance and lower power consumption. HCT may also outperform other methods in both image quality and computational speed. FIG. 6 illustrates a result 602 of applying HCT to an unadjusted image 604.

Figure 7:
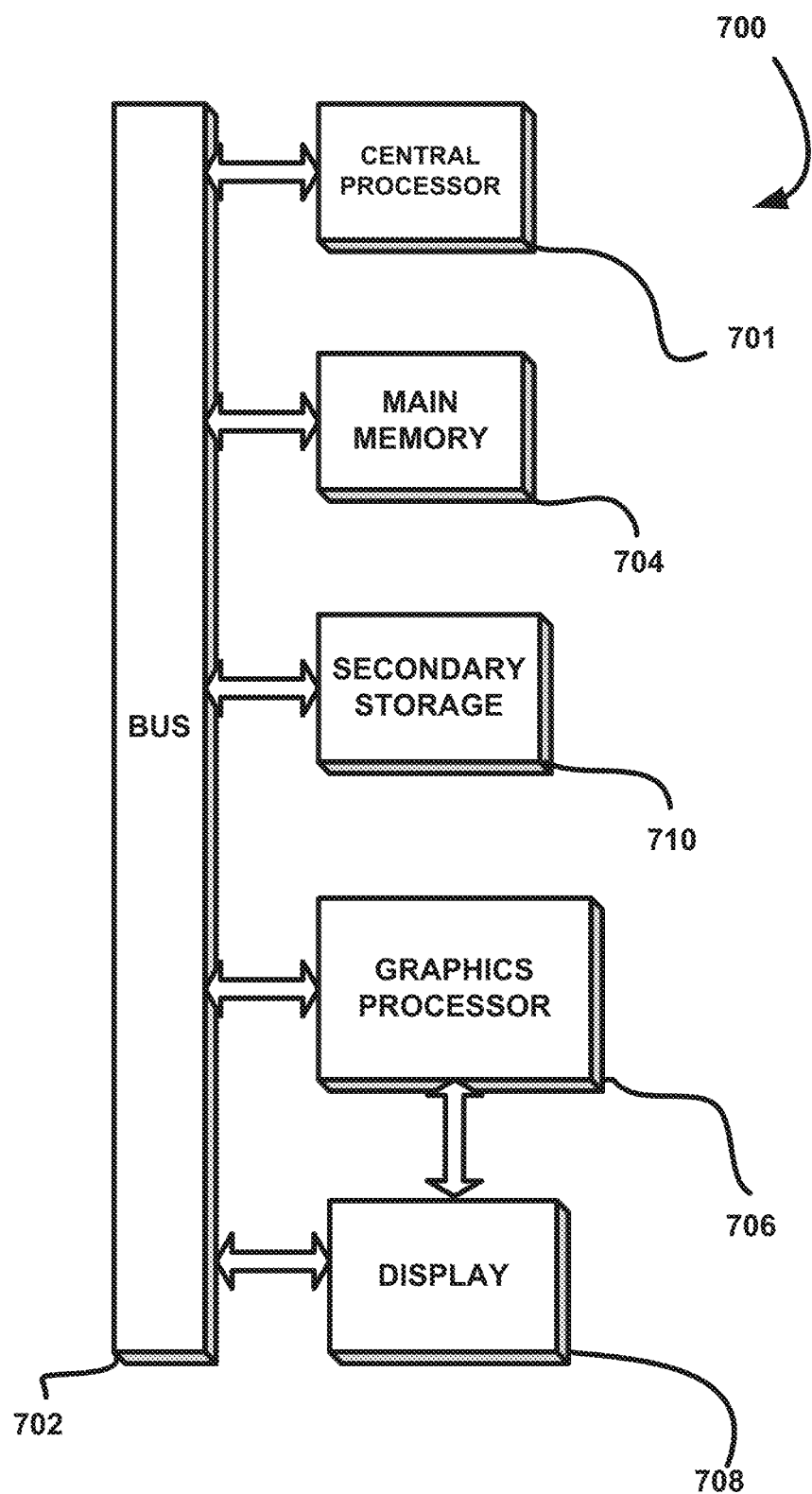
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710, volatile or non-volatile storage, and/or any other type of storage are possible examples of non-transitory computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, and/or any other type of logic. Still yet, the system 700 may take the form of various other devices including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying an image;
enhancing the identified image utilizing a compositor and a pyramid data structure including a plurality of levels as input into the compositor, where each of the plurality of levels of the pyramid data structure includes an instance of the identified image having a unique resolution, an upsampled instance of the identified image, and a resampled instance of the identified image; and
returning the enhanced image.

2. The method of claim 1, wherein enhancing the identified image includes performing spatially localized tonemapping on the image.

3. The method of claim 1, wherein enhancing the identified image includes performing multi-resolution image sharpening on the image.

4. The method of claim 1, wherein enhancing the identified image includes spatially correcting color saturation within the image.

5. The method of claim 1, wherein enhancing the identified image includes performing noise filtration on the image.

6. The method of claim 1, wherein enhancing the identified image includes enhancing the identified image utilizing a hyper-clarity transform (HCT) engine.

7. The method of claim 6, wherein the HCT engine includes a downsampler.

8. The method of claim 6, wherein the HCT engine includes an upsampler.

9. The method of claim 6, wherein the HCT engine includes the compositor.

10. The method of claim 6, wherein the HCT engine includes a chroma adjuster.

11. The method of claim 1, wherein a 3×3 bilateral is used during the processing of each level of the image pyramid data structure.

12. The method of claim 1, wherein enhancing the identified image utilizes a hyper-clarity transform and includes radially varying a threshold adjustment for lens shading compensation.

13. The method of claim 1, wherein enhancing the identified image utilizes a hyper-clarity transform and is included as a plug-in or part of a still picture editing program.

14. The method of claim 1, wherein the image is part of a video stream, such that video HCT and local tone mapping are performed.

15. The method of claim 1, wherein enhancing the identified image utilizes a hyper-clarity transform and is included as a plug-in or part of a video editing program.

16. The method of claim 1, wherein enhancing the identified image utilizes a hyper-clarity transform and is performed for video games as a post-rendering graphics processing unit (GPU) pass to apply HCT and local tone mapping to achieve increased apparent dynamic range and clarity.

17. The method of claim 1, wherein enhancing the identified image utilizes a hyper-clarity transform and is embedded in a system on a chip (SOC) for inclusion in one or more of a television and a monitor to apply to one or more of broadcast, playback, and video game inputs.

18. A non-transitory computer-readable storage medium storing instructions that, when executed by a processor, cause the processor to perform steps comprising:
- identifying an image;
- enhancing the identified image utilizing a compositor and a pyramid data structure including a plurality of levels as input into the compositor, where each of the plurality of levels of the pyramid data structure includes an instance of the identified image having a unique resolution, an upsampled instance of the identified image, and a resampled instance of the identified image; and
- returning the enhanced image.

19. A system, comprising:
- a processor for:
  - identifying an image;
  - enhancing the identified image utilizing a compositor and a pyramid data structure including a plurality of levels as input into the compositor, where each of the plurality of levels of the pyramid data structure includes an instance of the identified image having a unique resolution, an upsampled instance of the identified image, and a resampled instance of the identified image; and
- returning the enhanced image.

* * * * *